United States Patent
Savolainen et al.

(10) Patent No.: US 9,736,273 B2
(45) Date of Patent: Aug. 15, 2017

(54) METHOD FOR PROXYING COMMUNICATION BETWEEN A CONTENT-CENTRIC NETWORK AND AN INTERNET DOMAIN

(71) Applicant: Nokia Technologies Oy, Espoo (FI)

(72) Inventors: Teemu Ilmari Savolainen, Nokia (FI); Johanna Nieminen, Espoo (FI)

(73) Assignee: Nokia Technologies Oy, Espoo (FI)

(*) Notice: Subject to any disclaimer, the term of this patent is extended or adjusted under 35 U.S.C. 154(b) by 51 days.

(21) Appl. No.: 14/430,678

(22) PCT Filed: Oct. 5, 2012

(86) PCT No.: PCT/IB2012/055388
§ 371 (c)(1),
(2) Date: Mar. 24, 2015

(87) PCT Pub. No.: WO2014/053887
PCT Pub. Date: Apr. 10, 2014

(65) Prior Publication Data
US 2015/0312381 A1      Oct. 29, 2015

(51) Int. Cl.
*G06F 15/16* (2006.01)
*H04L 29/06* (2006.01)
(Continued)

(52) U.S. Cl.
CPC .......... *H04L 69/08* (2013.01); *H04L 41/0293* (2013.01); *H04L 51/38* (2013.01);
(Continued)

(58) Field of Classification Search
CPC ..... H04L 69/08; H04L 41/0293; H04L 51/38; H04L 61/1511; H04L 67/02; H04L 67/2823; H04L 69/327; H04L 67/2804
(Continued)

(56) References Cited

U.S. PATENT DOCUMENTS

| | | | |
|---|---|---|---|
| 8,386,622 B2* | 2/2013 | Jacobson | H04L 67/104 709/219 |
| 8,468,177 B2* | 6/2013 | Reeves | G06F 17/30592 707/802 |

(Continued)

FOREIGN PATENT DOCUMENTS

| | | |
|---|---|---|
| CN | 1954293 A | 4/2007 |
| WO | 2009080096 A1 | 7/2009 |
| WO | 2010045977 A1 | 4/2010 |

OTHER PUBLICATIONS

International Search Report received for corresponding Patent Cooperation Treaty Application No. PCT/IB2012/055388, dated Oct. 18, 2013, 4 pages.

(Continued)

*Primary Examiner* — Melvin H Pollack
(74) *Attorney, Agent, or Firm* — Alston & Bird LLP

(57) ABSTRACT

A method, apparatus and computer program product are provided to proxy communication between different types of networks, such as different types of networks that communicate in accordance with different protocols or different messaging patterns. In the context of a method, communication is supported with a content-centric network having one or more clients that are configured to communicate with publish and subscribe messages. The method also supports communication with one or more nodes configured to communicate in an Internet domain, such as by supporting communication with a CoAP network or a HTTP network. The method also proxies communicating between one or more clients of the content-centric network utilizing the publish and subscribe messages and one or more nodes in the Internet domain using an Internet domain message.

20 Claims, 11 Drawing Sheets

(51) Int. Cl.
*H04L 29/08* (2006.01)
*H04L 12/58* (2006.01)
*H04L 12/24* (2006.01)
*H04L 29/12* (2006.01)

(52) U.S. Cl.
CPC .......... *H04L 61/1511* (2013.01); *H04L 67/02* (2013.01); *H04L 67/2823* (2013.01); *H04L 69/327* (2013.01); *H04L 67/2804* (2013.01)

(58) Field of Classification Search
USPC ....................................................... 709/204
See application file for complete search history.

(56) References Cited

U.S. PATENT DOCUMENTS

| | | | | |
|---|---|---|---|---|
| 8,510,732 | B2* | 8/2013 | Chevrette | G06F 8/65 717/174 |
| 8,583,919 | B2* | 11/2013 | Sarela | H04L 12/189 370/312 |
| 8,751,664 | B2* | 6/2014 | Jacobson | H04L 29/12613 709/219 |
| 8,762,570 | B2* | 6/2014 | Qian | H04L 67/327 709/241 |
| 8,881,236 | B2* | 11/2014 | Wang | H04L 67/2819 726/3 |
| 8,918,835 | B2* | 12/2014 | Ravindran | H04L 63/104 726/1 |
| 8,930,456 | B2* | 1/2015 | Nace | G06Q 50/01 705/1.1 |
| 8,938,724 | B2* | 1/2015 | Harris | G06F 17/30905 709/246 |
| 8,996,626 | B2* | 3/2015 | Lee | H04L 67/2838 709/206 |
| 9,002,921 | B2* | 4/2015 | Westphal | H04L 67/06 709/202 |
| 9,049,053 | B2* | 6/2015 | Hersent | B60L 11/1844 |
| 9,049,251 | B2* | 6/2015 | Ravindran | H04L 67/327 |
| 9,185,186 | B2* | 11/2015 | Hong | H04L 67/327 |
| 9,191,459 | B2* | 11/2015 | Ravindran | H04L 67/327 |
| 9,270,701 | B1* | 2/2016 | Lamb | H04L 63/20 |
| 9,379,970 | B2* | 6/2016 | Wang | H04L 63/0272 |
| 9,432,320 | B2* | 8/2016 | Wookey | H04L 51/14 |
| 9,456,054 | B2* | 9/2016 | Jacobson | G06F 15/173 |
| 2007/0266392 | A1 | 11/2007 | Thoelke | |
| 2010/0312898 | A1 | 12/2010 | Jokela et al. | |
| 2011/0270895 | A1 | 11/2011 | Shelby | |
| 2013/0028140 | A1* | 1/2013 | Hui | H04W 40/248 370/255 |
| 2013/0185406 | A1* | 7/2013 | Choi | H04L 67/2847 709/223 |
| 2014/0032714 | A1* | 1/2014 | Liu | H04L 67/18 709/217 |

OTHER PUBLICATIONS

Augusto Morales Dominguez, et al. "Publish/Subscribe communication mechanisms over PSIRP", Oct. 19, 2011.
"Publish—Subscribe Pattern", Wikipedia, Retrieved on May 30, 2016, Webpage available at : https://en.wikipedia.org/wiki/Publish%E2%80%93subscribe_pattern.
Shelby et al., "Constrained Application Protocol (CoAP) Draft-Ietf-Core-Coap-09", CoRE Working Group, internet Draft, Mar. 12, 2012, pp. 1-116.
"Representational State Transfer", Wikipedia, Retrieved on May 30, 2016, Webpage available at : https://en.wikipedia.org/wiki/Representational_state_transfer.
Hartke, "Observing Resources in CoAP Draft-Ietf-Core-Observe-05", CoRE Working Group, Internet Draft, Mar. 12, 2012, pp. 1-35.
Deering et al., "Multicast Listener Discovery (MLD) for IPv6", RFC 2710, Network Working Group,Oct. 1999, pp. 1-29.
Vida et al., "Multicast Listener Discovery Version 2 (MLDv2) for IPv6", RFC 3810, Network Working Group, Jun. 2004, pp. 1-62.
Hinden et al., "IP Version 6 Addressing Architecture", RFC 4291, Network Working Group, Feb. 2006, pp. 1-25.
Hartke, "A CoAP Rest API for XMPP Publish-SubscribeDraft-Hartke-Core-Coap-Xmpp-00", CoRE Working Group, Internet Draft, Jan. 31, 2012, pp. 1-16.
Hunkeler et al., "MQTT-S—A Publish/subscribe Protocol for Wireless Sensor Networks", In Proc. 2nd Workshop on Information Assurance for Middleware Communications (IAMCOMM), Jan. 2008, 8 pages.
Liu et al., "Healthkiosk: A Family-Based Connected Healthcare System for Long-term Monitoring", IEEE Conference on Computer Communications Workshops, Technical Paper Search, RC25096, Jan. 10, 2011, pp. 1-7.
Bauer et al., "D1.2 First Reference Model White Paper", The Internet of Things Initiative, Sep. 9, 2011, pp. 1-43.
Kovatsch et al., "A Low-Power CoAP for Contiki", IEEE Eighth International Conference on Mobile Ad-Hoc and Sensor Systems, Oct. 17-22, 2011, 6 pages.
Extended European Search Report received for corresponding European Patent Application No. 12886105.1, dated Apr. 11, 2016, 4 pages.
Cianci et al., "Content Centric Services in Smart Cities", Sixth International Conference on Next Generation Mobile Applications, Services and Technologies, Sep. 12-14, 2012, pp. 187-192.
Written Opinion from corresponding International Patent Application No. PCT/IB2012/055388 dated Oct. 18, 2013.
Office Action for Chinese Application No. 201280076259.3 dated Mar. 13, 2017.

* cited by examiner

METHOD FOR PROXYING COMMUNICATION BETWEEN A CONTENT-CENTRIC NETWORK AND AN INTERNET DOMAIN

RELATED APPLICATION

This application was originally filed as Patent Cooperation Treaty Application No. PCT/IB2012/055388 filed Oct. 5, 2012.

TECHNOLOGICAL FIELD

An example embodiment of the present invention relates generally to proxying communication between networks and, more particularly, to proxying communication between a content-centric network and a network within the internet domain.

BACKGROUND

Different types of networks may communicate according to different protocols. In some instances, one or more devices in one network may desire to communicate with one or more devices in another network. However, the utilization of different protocols within the different networks may prevent the devices in one network from effectively communicating with the devices in the other network.

By way of example, a content-centric network, such as the Nokia Instant Community (NIC) powered by AwareNet, is a content-centric network that utilizes a publish-subscribe messaging pattern. While the publish-subscribe messaging pattern readily supports communication between devices that are members of the content-centric network, devices that are members of the content-centric network may be unable to effectively communicate with devices within the Internet domain, such as sensor and actuator networks that communicate according to a constrained application protocol (CoAP) or resources on the Internet that communicate in accordance with a hypertext transport protocol (HTTP). Consequently, although communication within a network may be readily supported, communication between different types of networks that communicate in accordance with different protocols or different messaging patterns may be more limited than is desired.

BRIEF SUMMARY

A method, apparatus and computer program product are provided in accordance with an example embodiment in order to proxy communication between different types of networks, such as different types of networks that communicate in accordance with different protocols, different messaging patterns or the like. For example, a method, apparatus and computer program product of one embodiment may proxy communication between a content-centric network, such as the Nokia Instant Community powered by AwareNet, and a network within the Internet domain, such as a CoAP network or a HTTP network. Thus, a method, apparatus and computer program product of an example embodiment facilitate communications between devices within the different networks, such as between a device within a content-centric network and a device within the Internet domain, for example, a device within a CoAP network or a HTTP network.

In one embodiment, a method is provided that includes supporting communication with a content-centric network having one or more clients that are configured to communicate with publish and subscribe messages. The method of this embodiment also includes supporting communication with one or more nodes configured to communicate in an Internet domain, such as by supporting communication with a CoAP network or a HTTP network. For example, communication with the one or more nodes may include supporting communication with a multicast group of one or more nodes. The method of this embodiment also includes proxying communicating between one or more clients of the content-centric network utilizing the publish and subscribe messages and one or more nodes in the Internet domain using an Internet domain message, such as a GET message.

In another embodiment, an apparatus is provided that includes at least one processor and at least one memory including computer program code with the at least one memory and the computer program code configured to, with the processor, cause the apparatus to at least support communication with a content-centric network having one or more clients that are configured to communicate with publish and subscribe messages. The at least one memory and computer program code are also configured to, with the processor, cause the apparatus to support communication with one or more nodes configured to communicate in an Internet domain, such as by supporting communication within a CoAP network or within a HTTP network. For example, the at least one memory and the computer program code may be configured to, with the processor, cause the apparatus of one embodiment to support communication with one or more nodes by supporting communication with a multicast group of one or more nodes. The at least one memory and the computer program code of this embodiment are also configured to, with the processor, cause the apparatus to proxy communication between one or more clients in the content-centric network using the publish and subscribe messages and one or more nodes in the Internet domain using an Internet domain message, such as a GET message.

In a further embodiment, a computer program product is provided that includes at least one non-transitory computer-readable storage medium having computer-executable program code portions stored therein with the computer-executable program code portions including program code instructions for supporting communication with a content-centric network having one or more clients configured to communicate with publish and subscribe messages. The computer-executable program code portions also include program code instructions for supporting communication with one or more nodes configured to communicate in an internet domain, such as by supporting communication within a CoAP network or a HTTP network. For example, the program code instructions for supporting communication with one or more nodes may include program code instructions for supporting communication with a multicast group of one or more nodes. The computer-executable program code portions of this embodiment also include program code instructions for proxying communication between one or more clients in the content-centric network using the publish and subscribe messages and one or more nodes in the internet domain using an Internet domain message, such as a GET message.

In yet another embodiment, an apparatus is provided that includes means for supporting communication with a content-centric network having one or more clients that are configured to communicate with the publish and subscribe messages. The apparatus also includes means for supporting communication with one or more nodes configured to communicate in an internet domain, such as by supporting communication with a CoAP network or a HTTP network. For example, the means for supporting communication with one or more nodes may include means for supporting communication with a multicast group of one or more nodes. The apparatus of this embodiment also includes means for proxying communication between one or more clients of the content-centric network using the publish and subscribe messages and one or more nodes in the internet domain using an Internet domain message, such as a GET message.

BRIEF DESCRIPTION OF THE DRAWINGS

Figure 1:
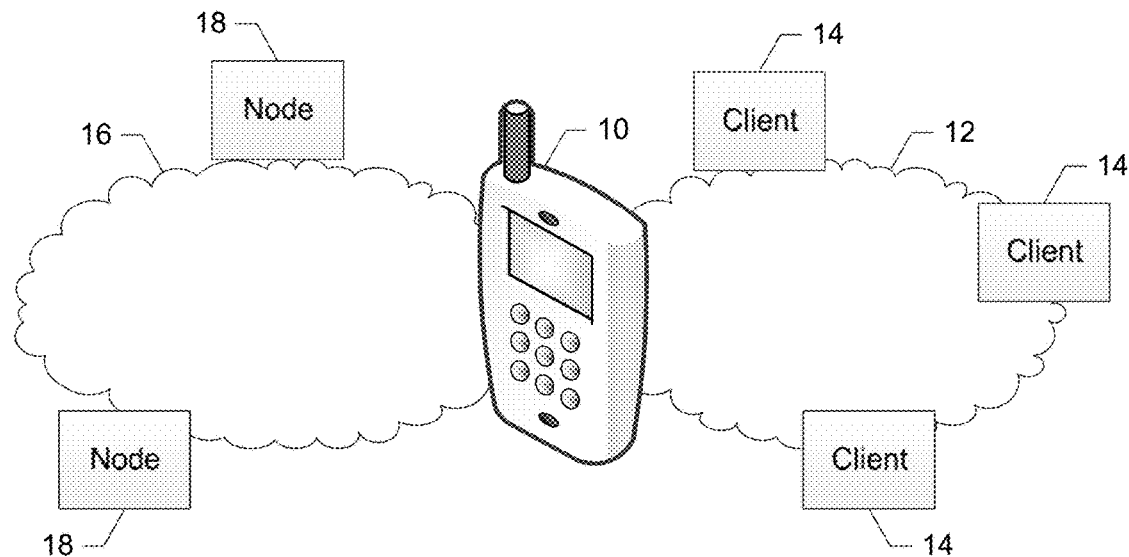
Figure 2:
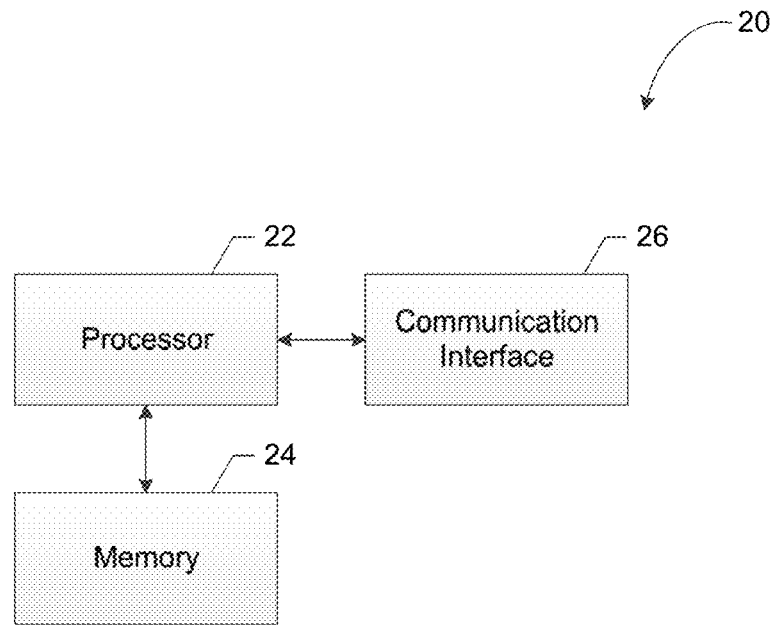
Figure 3:
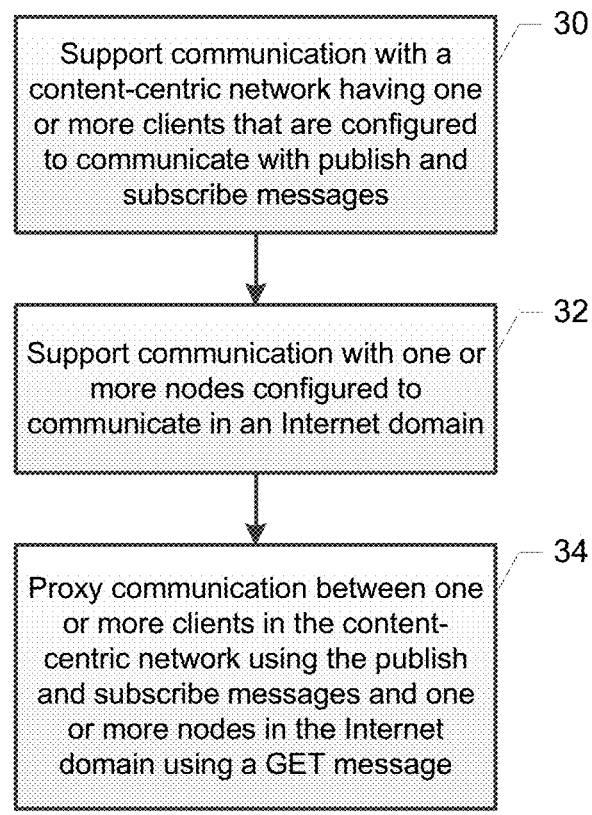
Figure 4:
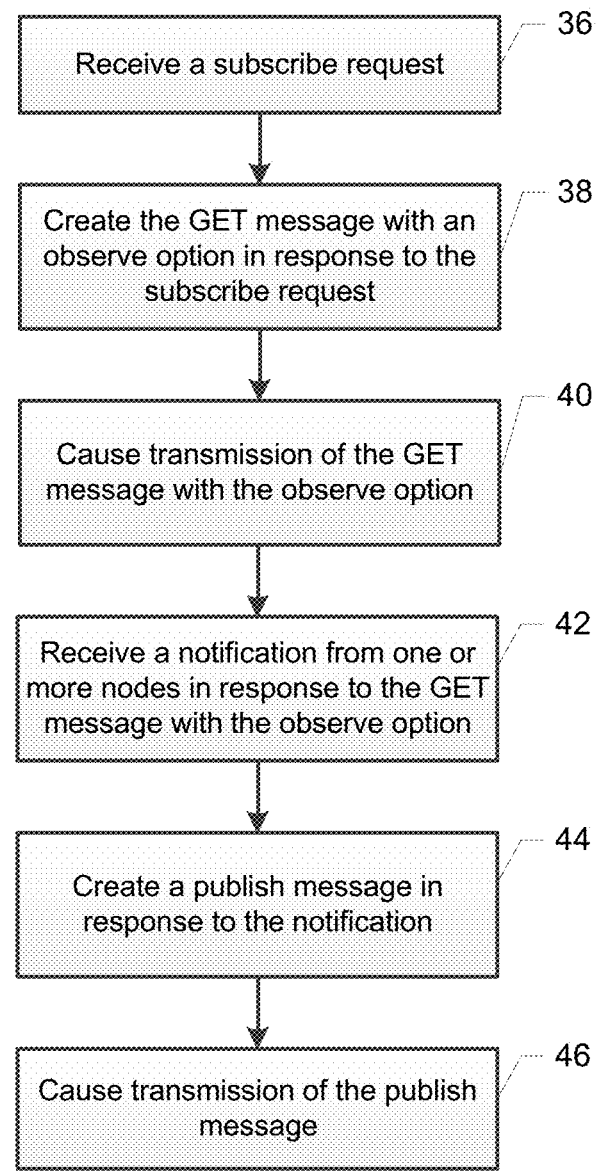
Figure 5:
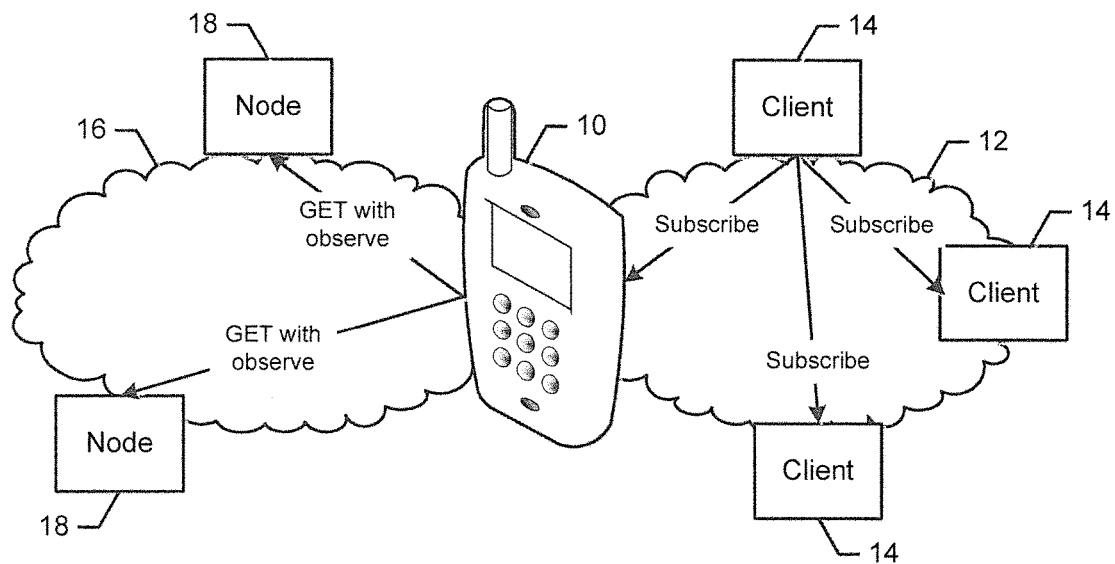
Figure 6:
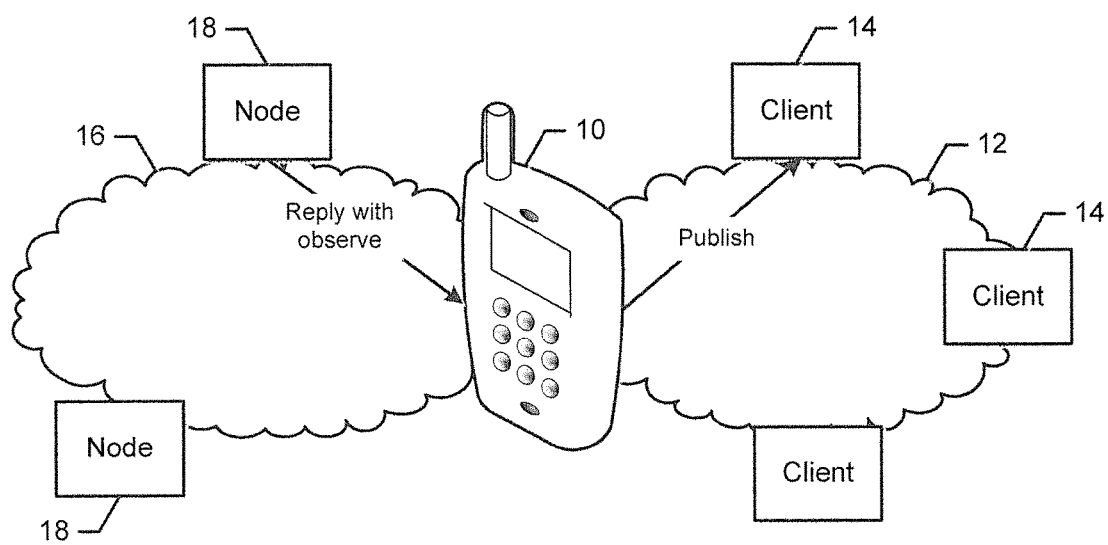
Figure 7:
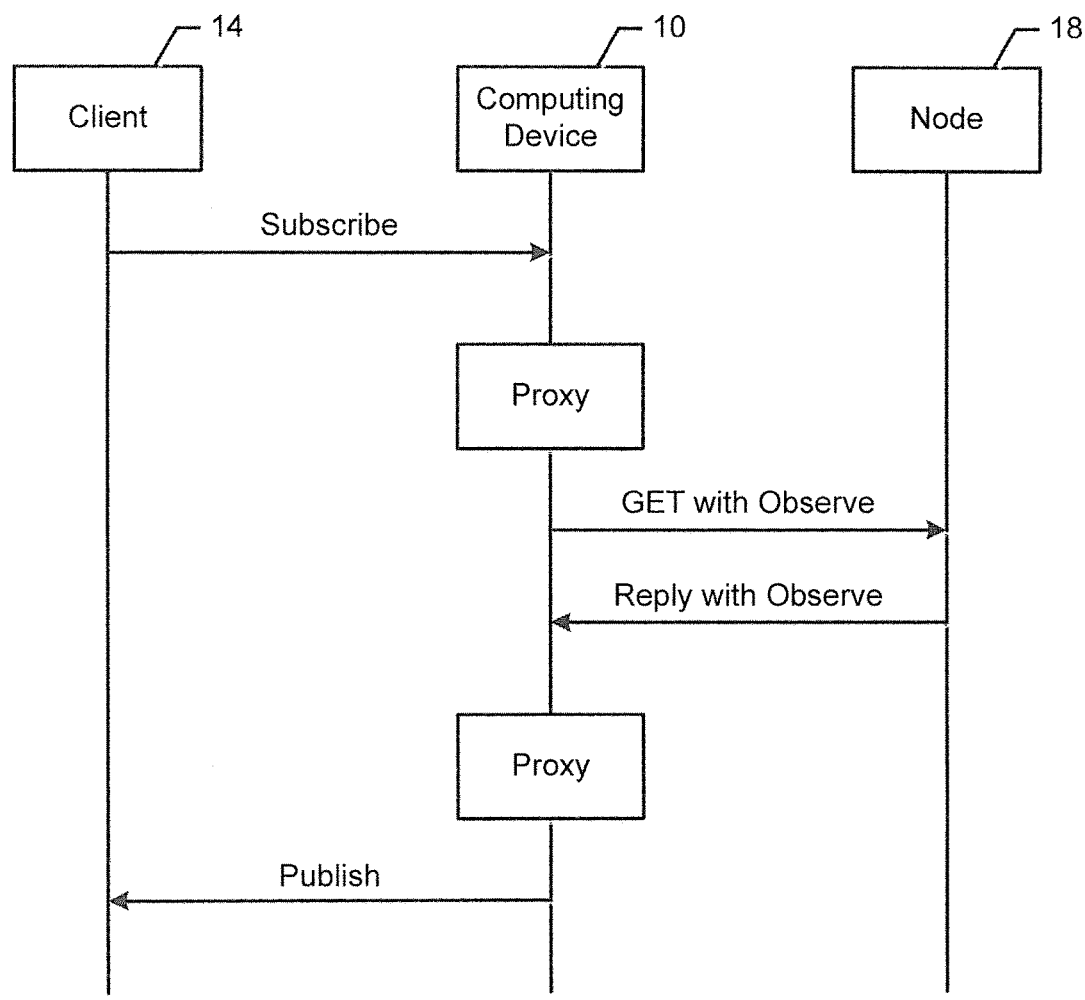
Figure 8:
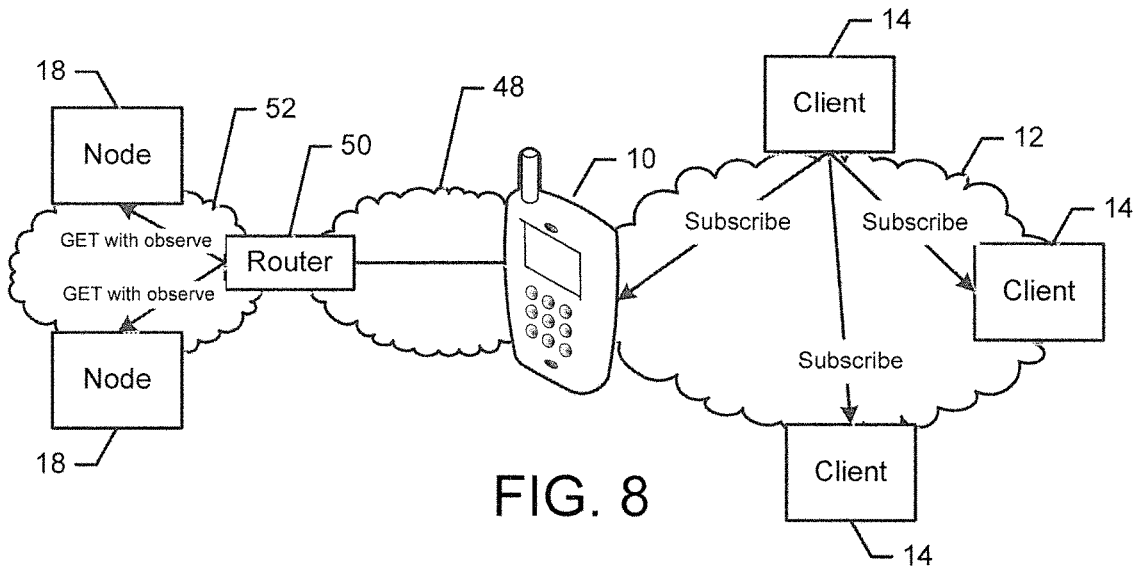
Figure 9:
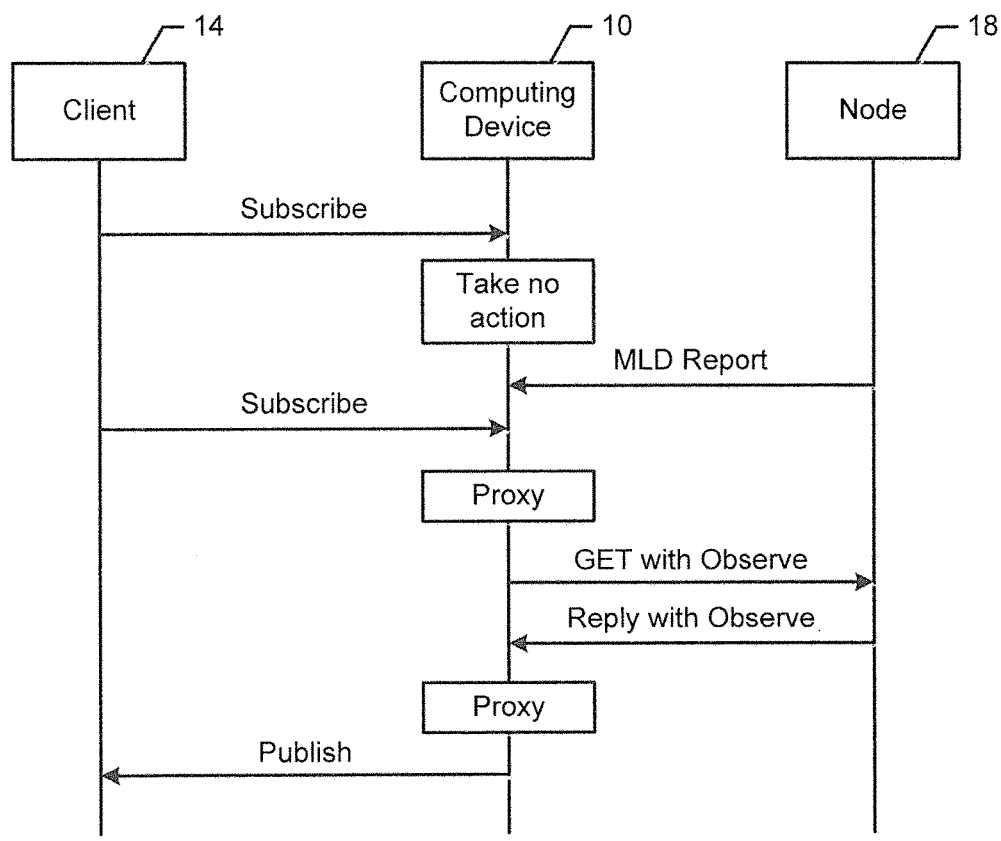
Figure 10:
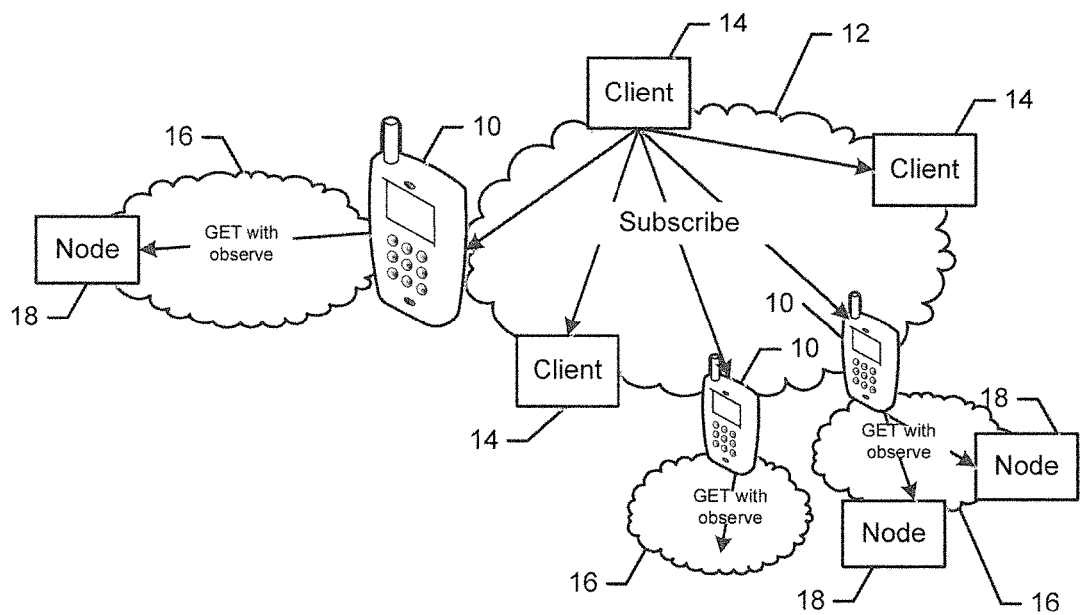
Figure 11:
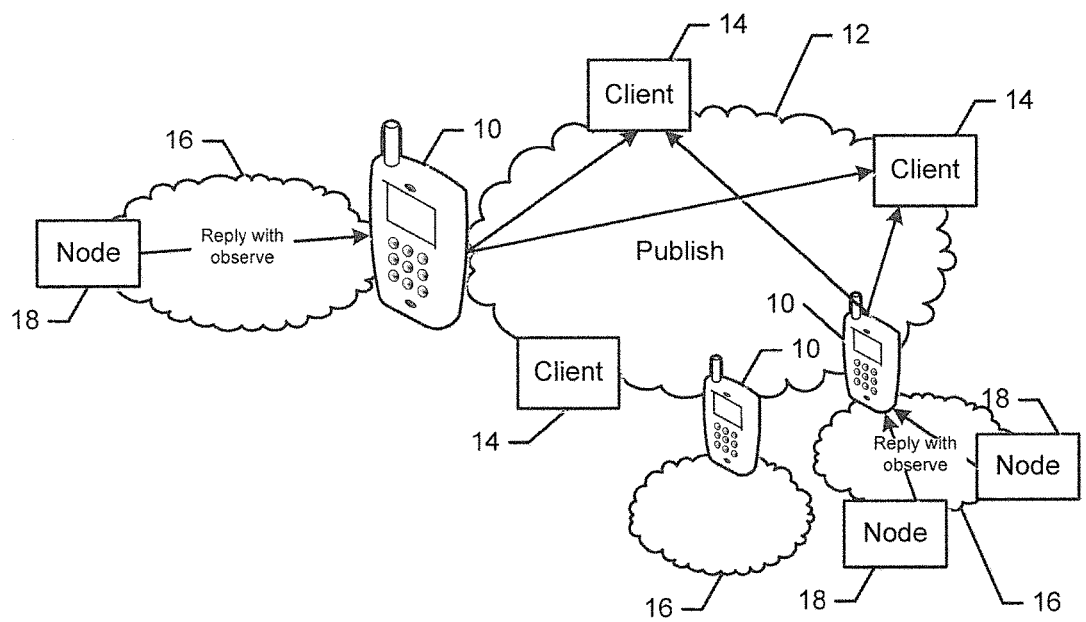
Figure 12:
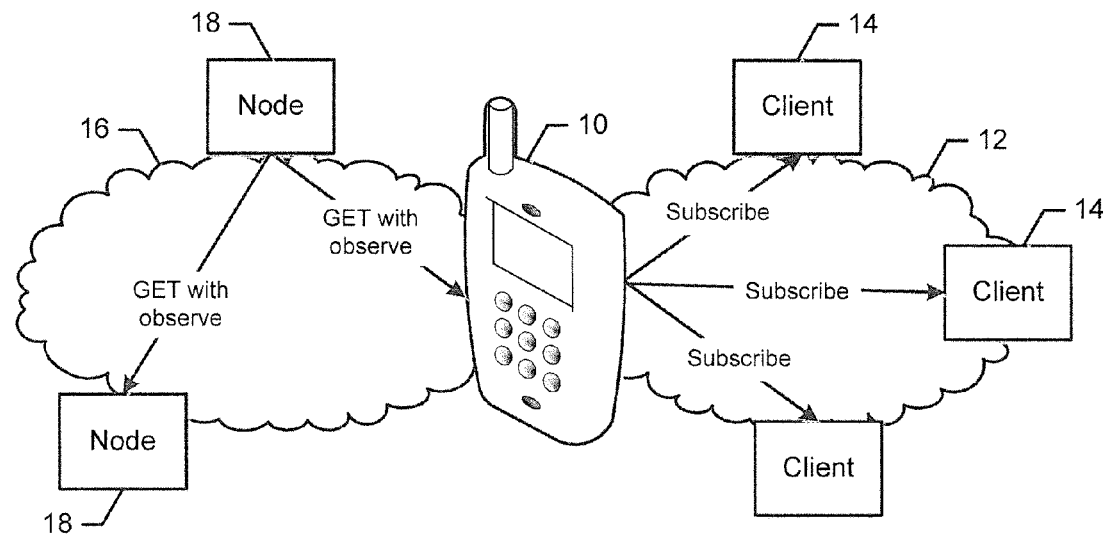
Figure 14:
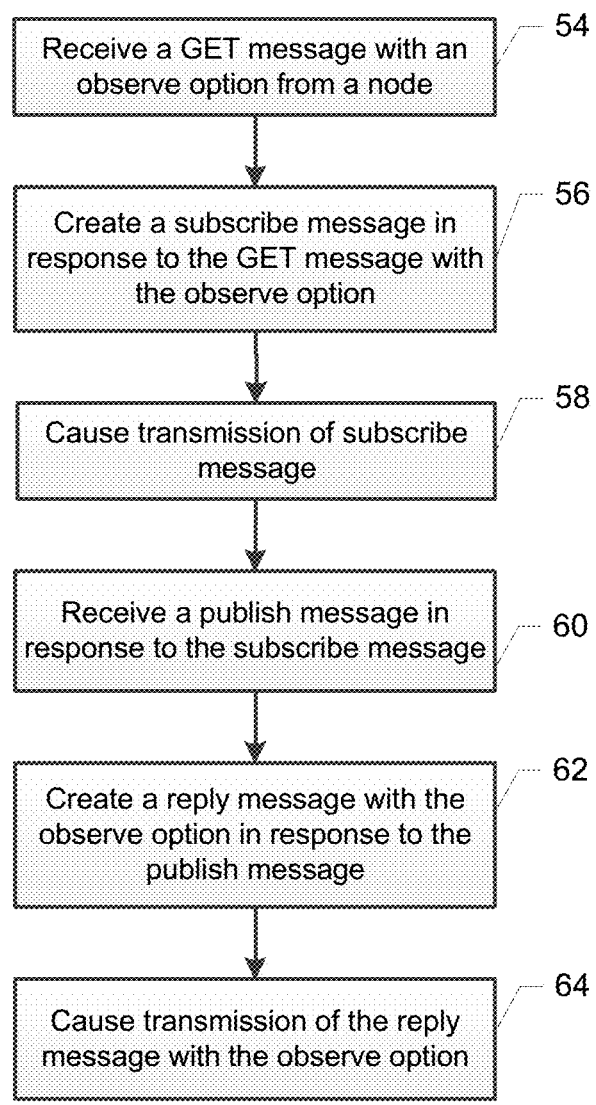
Figure 15:
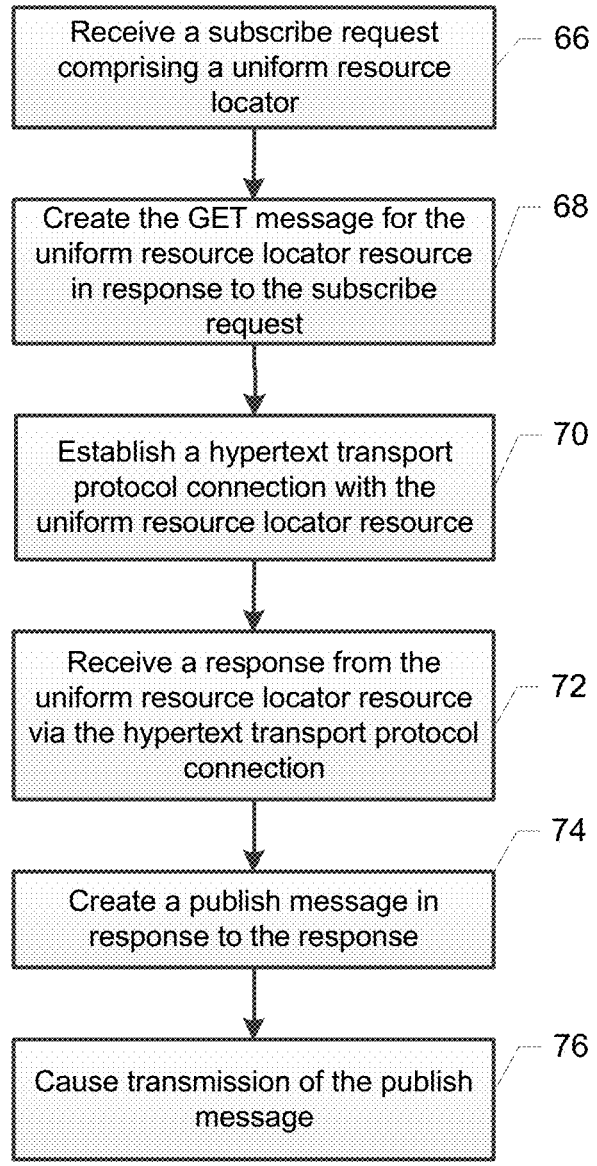
Figure 16:
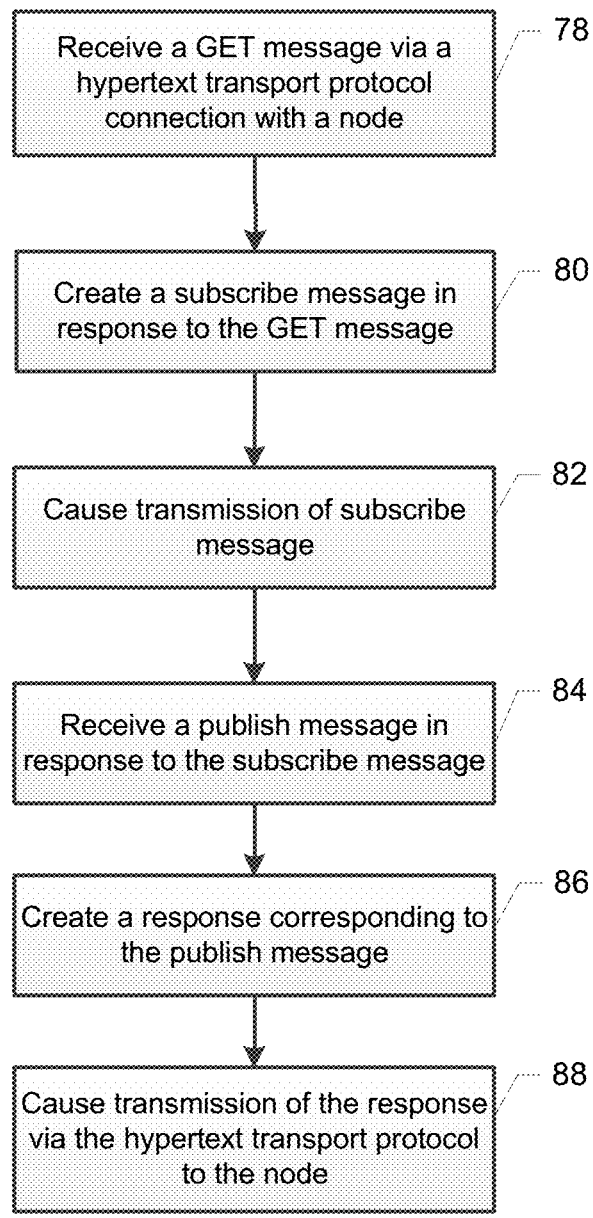

Having thus described certain embodiments of the present invention in general terms, reference will now be made to the accompanying drawings, which are not necessarily drawn to scale, and wherein:

FIG. 1 is a schematic representation of a content-centric network and a network in the internet domain with communication between the networks being proxied by a terminal configured in accordance with an example embodiment of the present invention;

FIG. 2 is an apparatus that may be specifically configured in accordance with an example embodiment of the present invention in order to proxy communication between a content-centric network and a network within the internet domain;

FIG. 3 is a flow chart illustrating operations that may be performed, such as by the apparatus of FIG. 2, in order to proxy communications between a content-centric network and a network within the internet domain in accordance with an example embodiment of the present invention;

FIG. 4 is a flowchart illustrating the operations performed to receive a subscribe message from a client within a content-centric network and to generate a GET message with an observe function for a node within the internet domain and to correspondingly process the resulting response in accordance with an example embodiment to the present invention;

FIG. 5 is a schematic representation of the receipt of a subscribe request from a client within a content-centric network and the generation of a GET message with an observe function for a node within the internet domain in accordance with an example embodiment of the present invention;

FIG. 6 is a schematic representation of the receipt of a reply message with an observe function from a node within the internet domain and the generation of a publish message for a client within a content-centric network in accordance with an example embodiment of the present invention;

FIG. 7 is a signal flow diagram illustrating the proxying of communication between a client within a content-centric network that utilizes subscribe and publish messages and a node within the internet domain that utilizes GET messages with an observe function in accordance with an example embodiment to the present invention;

FIG. 8 is a schematic representation of the proxying of communication between a client within a content-centric network and a node within the internet domain in which the node within the internet domain is remote from the apparatus that proxies communication in accordance with an example embodiment of the present invention;

FIG. 9 is a signal flow diagram illustrating the proxying of communication between a client within a content-centric network and a node within the internet domain in which the node within the internet domain issues a request to join a multicast group in accordance with an example embodiment of the present invention;

FIG. 10 is a schematic representation of a subscribe message being provided to a plurality of apparatuses that proxy communication with different networks within the internet domain in accordance with an example embodiment of the present invention;

FIG. 11 is a schematic representation of apparatuses that proxy communications with different networks within the internet domain and that provide reply messages with the observe function to clients within a content-centric message via publish messages in accordance with an example embodiment of the present invention;

FIG. 12 is a schematic representation of the proxying of communication by receiving a GET message with an observe function from a node within the internet domain and that may generate a subscribe message for a client within a content-centric network in accordance with an example embodiment of the present invention;

FIG. 15 is a schematic representation of the proxying of communication between a content-centric network and a network within the internet domain by receiving a publish message from a client within the content-centric network and by generating a reply message with an observe function for a node within the internet domain in accordance with an example embodiment of the present invention;

FIG. 14 is a flowchart illustrating the operations performed in conjunction with the proxying of communication between a network within the internet domain and a content-centric network in response to a GET message with an observe function from a node within the internet domain in accordance with an example embodiment of the present invention;

FIG. 15 is a flowchart illustrating the operations performed in order to proxy communication between a content-centric network and a hypertext transport protocol network in response to a subscribe message from a client within the content-centric network in accordance with an example embodiment of the present invention; and FIG. 16 is a flowchart illustrating the operations performed in order to proxy communication between a content-centric network and a hypertext transport protocol network in response to a GET message from a node within the hypertext transport protocol network in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

Referring now to FIG. 1, a terminal 10 for proxying communication between a content-centric network 12 and a network 16 within the internet domain is illustrated. The terminal may be embodied in a variety of different manners. In one example embodiment, the terminal may be a mobile terminal, such as a portable digital assistant (PDA), mobile telephone, smartphone, pager, mobile television, gaming device, laptop computer, camera, tablet computer, or any combination of the aforementioned, and other types of voice and text communications systems. Alternatively, the terminal may be fixed and, as such, may be a personal computer, a computer workstation, a server or the like.

A content-centric network 12 includes a plurality of clients 14, such as mobile and/or fixed terminals, for example, a PDA, mobile telephone, smartphone, pager, mobile television, gaming device, laptop computer, camera, tablet computer, or any combination of the aforementioned, and other types of voice and text communications systems. The clients of a content-centric network may be configured to communicate in accordance with publish and subscribe messages. One example of a content-centric network is the Nokia Instant Community powered by AwareNet that makes use of a publish-subscribe messaging pattern. However, other types of content-centric networks that utilize a publish-subscribe messaging pattern may alternatively be employed. The network 16 in the internet domain may be a network of nodes 18 using CoAP (hereinafter referenced as a "CoAP network") that are configured to implement a restful application program interface (API). Alternatively, the network of the internet domain may be a network of nodes using HTTP (hereinafter referenced as a "HTTP network"). Regardless of the configuration of the network within the internet domain, the network may include a plurality of nodes, such as sensors, actuators and the like. Additionally or alternatively, one or more of the nodes may be configured to collect data from other sources and, as such, may be embodied as a server, database, repository or the like in an example embodiment. For example, a CoAP network may include one or more sensors, such as a heart rate sensor, a temperature sensor or the like.

In accordance with an example embodiment, an apparatus 20 may be provided in order to facilitate proxying of communication between a content-centric network 12 and a network 16 within the internet domain. For example, the apparatus may be embodied by a terminal 10, such as shown in FIG. 2, that is configured to communicate with both one or more clients 14 within a content-centric network and one or more nodes 18 within a network within the internet domain. Regardless of its implementation, the apparatus may include or otherwise be in communication with a processor 22, a memory device 24 and a communication interface 26. It should be noted that while FIG. 2 illustrates one example of a configuration of an apparatus for proxying communication between disparate networks, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some example embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a terminal 10 configured to employ an example embodiment of the present invention. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network and/or any other device or module in communication with the apparatus 20. For example, the communication interface may be configured to communicate with one or more clients 14 within the content-centric network 12 and one or more nodes 18 within the internet domain.

In this regard, the communication interface 26 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms. In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 3, the operations performed, such as by the apparatus 20 of FIG. 2 embodied, for example, by a terminal 10 in communication with both a content-centric network 12 and a network 16 within the internet domain, are illustrated. As shown in block 30, the apparatus includes means, such as the processor 22, the communication interface 26 or the like, for supporting communication with the content-centric network having one or more clients 14 that are configured to communicate with publish and subscribe messages. Additionally, the apparatus includes means, such as a processor, the communication interface or the like, for supporting communication with one or more nodes 18 within an internet domain, such as by supporting communication with a CoAP network, supporting communication using a HTTP connection or the like. See block 32 of FIG. 3.

The apparatus 20 of this example embodiment also includes means, such as the processor 22, the communication interface 26 or the like, for proxying communication between one or more clients 14 in the content-centric network 12 using the publish and subscribe messages and one or more nodes 18 in the internet domain using an Internet domain message. In this regard, the Internet domain message will be generally described as a GET message. However, reference to a GET message is provided by way of example and not of limitation as the method, apparatus and computer program product of other example embodiments may utilize other Internet domain messages instead of a GET message, such as a POST message or a PUT message, albeit with the observe option as referenced below in conjunction with a GET message. As such, subsequent reference to a GET message is simply one example of a more general Internet domain message that may be employed in other example embodiments. By proxying communication, the method and apparatus of an example embodiment permit a client within the content-centric network and a node within the internet domain to communicate, such as by passing intelligible data therebetween, even in instances in which the client within the content-centric network and the node within the internet domain would otherwise bet unable to effectively communicate.

The operations performed by one example embodiment of the method and apparatus of the present invention are shown in more detail in FIG. 4 in which the internet domain includes a CoAP network 16. In this regard, the apparatus 20, such as the processor 22, the communication interface 26 or the like, may support communication with the content-centric network 12 by receiving a subscribe request. See block 26 of FIG. 4. As shown in FIG. 5, for example, a client 14 of the content-centric network may issue a subscribe request to one or more other clients within the content-centric network including the terminal 10 that embodies the apparatus of an embodiment of the present invention. Although the subscribe request may solicit any of a variety of different types of information, the subscribe request of one embodiment solicits information relating to a sensed parameter, such as a temperature reading. As shown in block 38 of FIG. 4, the apparatus, such as the processor, the communication interface or the like, may proxy communication by creating the GET message with an observe option in response to the subscribe request. As shown in block 40 of FIG. 4 and in FIG. 5, the apparatus of this embodiment, such as the processor, the communication interface or the like, may support communication with one or more nodes within the internet domain by causing transmission of the GET message with the observe option. In this regard, the GET message with the observe option may be transmitted to all of the nodes than the CoAP network, to a selected node within the CoAP network or to a selected group of nodes within the CoAP network.

In one example embodiment, a multicast group of nodes 18 within the internet domain may be defined with the definition of the multicast group being stored or otherwise accessible by the apparatus 20. In one embodiment, the multicast group is defined so as to be associated with a respective resource or respective type of resource to which a client 14 in the content-centric network 12 subscribes. For example, the multicast group may include the node(s) within the internet domain that are configured to provide temperature information in an instance in which the client in the content-centric network subscribes to temperature information. Alternatively, the multicast group may be associated with a particular content-centric network such that the apparatus of this embodiment is configured to proxy all subscribe requests from clients within the content-centric network to the same multicast group within the internet domain.

In one example embodiment, the apparatus 20, such as the processor 22, the communications interface 26 or the like, may be configured to identify the extent of the internet domain to which the proxied communication is to be distributed. For example, the apparatus may be configured to distribute the proxied communication only to nodes 18 connected to the same link as the terminal 10 that implements the apparatus. As such, the multicast group of this embodiment may be associated with a link-local multicast address, such as a Bluetooth low energy link. Alternatively, the apparatus, such as the processor, the communications interface or the like, may be configured to distribute the proxied communication to a particular site or globally throughout the internet domain.

In one example embodiment, the apparatus 20, such as the processor 22, the communications interface 26 or the like, may utilize multicast listener discovery (MLD) in which a node 18 within the internet domain provides a request to join a multicast group that will receive proxied communication from one or more clients 14 within a content-centric network 12. Thus, the apparatus, such as the processor, the communications interface or the like, may receive the request from one or more nodes to join the multicast group and may therefore define the multicast group so as to include the one or more nodes that provided the request. Although described above in conjunction with a multicast group of nodes within the internet domain, the multicast group may be correspondingly defined to include one or more clients within the content-centric network in an instance in which a message is to be transmitted to the content-centric network.

As shown in block 42 of FIG. 4 and in FIG. 6, the apparatus 20, such as the processor 22, the communications interface 26 or the like, may support communication with one or more nodes 18 within the internet domain by receiving a notification, such as a reply with the observe function, from one or more nodes in response to the GET message with the observe option. In this regard, the notification from the one or more nodes includes information relevant to the subscribe request, such as temperature information in response to a subscribe request soliciting such temperature information. The apparatus, such as the processor, the communications interface or the like, may then proxy the communication by creating a publish message in response to the notification. See block 44 of FIG. 4. Further, as shown in block 46 of FIG. 4 and in FIG. 6, the apparatus, such as the processor, the communications interface or the like, may then support communication with the content-centric network by causing transmission of the publish message, such as by transmitting the publish message to each client within the content-centric network that has subscribed to receive information of the type provided by the node within the internet domain.

Referring now to FIG. 7, a further example of the message sequence that may be exchanged between a client 14 within the content-centric network 12, an apparatus 20 embodied by a terminal 10 that proxies communication between the content-centric network and the internet domain and a node 18 within the internet domain is illustrated. In this regard, a client within the content-centric network may initially transmit a subscribe message. In one example embodiment, the subscribe message may include a scheme and an item. An item may consist of a scheme and a value that is an instance of the given scheme. The scheme may specify the type for an item, such as the valid set of values for an item. The type of an item may be a simple type, such as Boolean, integer or a character string, or a more complex type, such as a structure, list or dictionary. For example, the scheme may associate a particular publish or subscribe message with a CoAP network and the item may identify one or more particular nodes within the CoAP network as defined by the Internet Protocol for Smart Objects (IPSO) Alliance.

In an instance in which the apparatus 20 proxies communication between a content-centric network 12 and a CoAP network 16, the apparatus, such as the processor 22, the communications interface 26 or the like, may be configured to proxy the subscribe message by converting the subscribe message to a GET message with an observe option. The GET message with the observe option may then be transmitted to one or more nodes 18 within the CoAP network. Once the one or more nodes that receive the GET message with the observe option have relevant information, a reply message with an observe option may be provided to the apparatus such that the apparatus, for example, the processor, the communications interface or the like, may then proxy the reply message by converting the reply message including the information provided by the node within the CoAP network to a publish message that is transmitted to the client 14 within the content-centric network. In this regard, the publish message may include an item, such as the information provided by the node within the CoAP network.

As described above, the nodes 18 within the internet domain may be nodes that may be identified by a link-local address, such as via a Bluetooth low energy link. However, in another embodiment, the nodes within the internet domain may be distributed on a more global basis so as to be throughout the internet. As shown in FIG. 8, for example, a subscribe message that is provided by a client 14 within a content-centric network 12 may be proxied by an apparatus 20 of one embodiment so as to generate a GET message with an observe option that is multicast to nodes throughout the internet domain. In this embodiment, the apparatus may be in communication with the internet 48 which, in turn, is in communication, via a router 50, with a CoAP network 52. As such, the nodes that receive the GET message with the observe option may be much further from the terminal 10 that embodies the apparatus and, in turn, much further from the content-centric network.

In order to avoid transmitting an excessive number of GET messages with the subscribe option throughout the internet domain, a multicast group may be defined based upon requests by nodes 18 within the internet domain to join the multicast group. As shown by the messaging sequence of FIG. 9, for example, a client 14 of a content-centric network 12 may issue a subscribe request that may be received by an apparatus 20 embodied by the terminal 10. In an instance in which no nodes within the internet domain have joined a multicast group associated with the subscribe request received by the apparatus, such as in an instance in which no nodes within the internet domain have joined a multicast group associated with the client that issued the subscribe message, no nodes within the internet domain have joined the multicast group associated with the content-centric network of which the client is associated or no nodes within the internet domain have joined the multicast group associated with subscribe messages soliciting information of the particular type, the apparatus, such as the processor 22, the communications interface 26 or the like, may not generate or distribute a GET message to any nodes within the internet domain. However, in an instance in which the apparatus, such as the processor, the communications interface or the like, subsequently receives a request by one or more nodes within the internet domain to join a particular multicast group, a subsequent subscribe message by the client within the content-centric network may be proxied by the apparatus, such as the processor, the communication interface or the like, by being converted to a GET message with an observe option which is then caused to be transmitted to the one or more nodes within the internet domain that have requested to join to the relevant multicast group.

In an instance in which one or more of the nodes 18 within the internet domain that are members of the multicast group have relevant information with respect to the subscribe request, the nodes may provide and the apparatus 20, such as the processor 22, the communications interface 26 or the like, may receive a reply message with an observe option that includes the information requested by subscribe message. The apparatus, such as the processor, the communications interface or the like, may proxy the communication by converting the reply message with the observe option to a publish message including the relevant information provided by the one or more nodes within the internet domain. The apparatus, such as the processor, the communications interface or the like, may then cause transmission of the publish message including the relevant information to one or more clients 14 within the content-centric network 12 that have subscribed to receive the relevant information. As such, the method and apparatus of one example embodiment may permit information to be exchanged between a client within a content-centric network and one or more nodes within an internet domain in instances in which the client within the content-centric network and the node within the internet domain may be otherwise unable to directly communicate in an intelligible manner.

As shown in FIG. 10, a system of one example embodiment may include multiple apparatuses 20 embodied by respective terminals 10 that proxy communication between a content-centric network 12 and respective networks within 16 the internet domain. In the illustrated embodiment, three terminals may proxy communications between a content-centric network and respective networks within the internet domain. Depending upon the nodes 18 within the respective networks within the internet domain, the proxied communication may be distributed in different manners. For example, an apparatus embodied by a first terminal may cause transmission of a GET message within an observe option in response to a subscribe message to a single node within the respective network of the internet domain since only a single node is a member of the relevant multicast group. Alternatively, the apparatus embodied by the second terminal may receive the subscribe message and, in one embodiment, may cause transmission of a multicast GET message with an observe function even in an instance in which the network within the internet domain associated with the second terminal does not include any nodes that are configured to provide relevant information. Still further, the apparatus embodied by the third terminal may cause transmission of a multicast GET message with an observe function to multiple nodes within the relevant network of the internet domain in an instance in which multiple nodes are members of the relevant multicast group.

As shown in FIG. 11, the nodes 18 within the various networks 16 of the internet domain that receive the GET message with an observe option from the respective terminal 10 may transmit a reply message with an observe function and that further includes the relevant information, such as temperature measurements, requested by the subscribe message. The apparatuses 20 embodied by the terminals that receive the reply message with an observe function including the relevant information may proxy the communication and may, in turn, support communication within the content-centric network 12 that has subscribed to information of the particular type, such as to temperature measurements.

Figure 13:
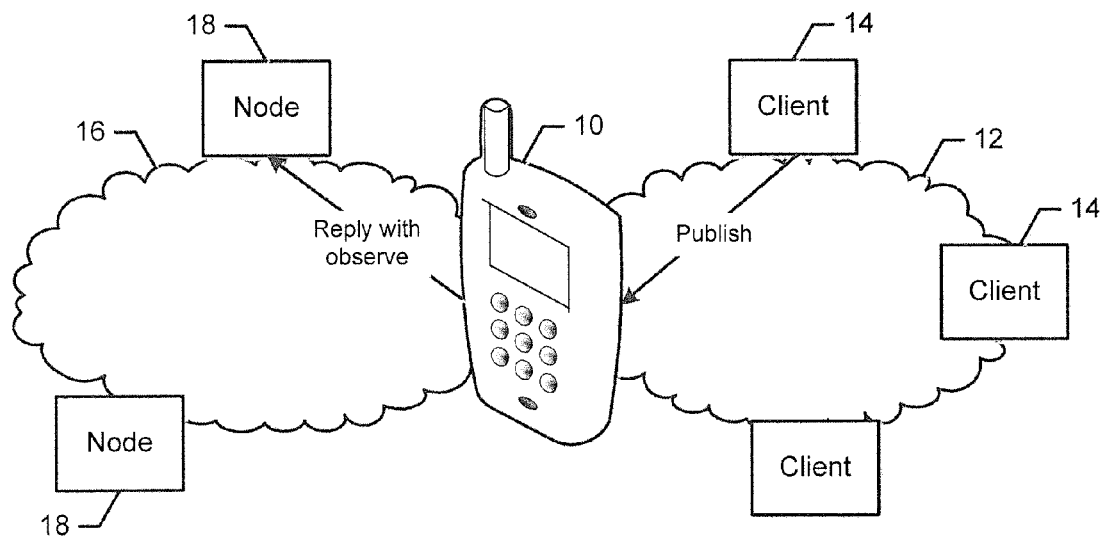

Although described above in conjunction with the solicitation of information by a client 14 within a content-centric network 12 from a node 18 within the internet domain, a node within the internet domain, such as within a CoAP network may solicit information from a client within the content-centric network. In this regard and is shown, for example, in FIG. 12, a node within the internet domain, such as within a CoAP network, may transmit, such as by multicasting, a GET message with an observe function soliciting information of a particular type, such as temperature information. The apparatus 20, along with one or more other nodes within the CoAP network, may receive the GET message with the observe function. The apparatus, such as the processor 22, the communication interface 26 or the like, may proxy the communication so as to generate a subscribe message that is transmitted to one or more clients within the content-centric network, such as by transmitting the subscribe message to a particular multicast group. As shown in FIG. 13, the clients within the content-centric network that receive the subscribe request may publish the relevant information, such as the temperature measurements, with the apparatus embodied by the terminal 10 thereafter receiving the publish message, converting the publish message to a corresponding reply message and then causing transmission of a reply message with an observe function to the nodes within the internet domain that have solicited the respective information.

By way of further explanation of the embodiment of FIGS. 12 and 13, the operations performed by an apparatus 20 in accordance with an example embodiment in which a node 18 within the internet domain solicits information from a client 14 within the content centric network 12 are illustrated in FIG. 14. In this regard, as shown in block 54 of FIG. 14 as well as FIG. 12, the apparatus embodied by the terminal 10 may include means, such as a processor 22, the communication interface 26 or the like, for supporting communication with one or more nodes within the internet domain by receiving a GET message with an observe option from a node soliciting information of a particular type. The apparatus, such as the processor, the communications interface or the like, may then proxy communication by creating a subscribe message in response to the GET message with an observe option. See block 56 of FIG. 14 as well as FIG. 13. The apparatus of this embodiment, such as the processor, the communications interface or the like, may then support communication with the content-centric network by causing transmission of the subscribe message to one or more clients within the content-centric network. See block 58 of FIG. 14 as well as FIG. 13.

As shown in block 60 of FIG. 14 as well as in FIG. 13, the apparatus 20, such as the processor 22, the communications interface 26 or the like, may then support communication with the content-centric network 12 by receiving a publish message in response to the subscribe message with the publish message providing the requested type of information, such as a temperature reading. The apparatus, such as the processor, the communications interface or the like, may then proxy communication by creating a reply message with the observe option in response to the publish message. See block 62. The apparatus, such as the processor, the communications interface or the like, may then support communication with one or more nodes 18 within the internet domain by causing transmission of the reply message with the observe option which provides the requested information, such as the temperature readings, to the one or more nodes. See block 64 of FIG. 14.

Although described heretofore in conjunction with the communication between clients 14 within a content-centric network 12 and nodes 18 within a CoAP network 16, the apparatus 20 of one example embodiment may correspondingly proxy communication between clients within a content-centric network and nodes within an HTTP network. In this embodiment, the apparatus, such as the processor 22, the communications interface 26 or the like, may support communication with the content-centric network by receiving a subscribe request comprising a uniform resource locator (URL). See block 66 of FIG. 15. The apparatus, such as the processor, the communications interface or the like, of this embodiment may then proxy communication by creating the GET message for the URL resource in response to the subscribe request. See block 68. The apparatus, such as the processor, the communications interface or the like, may then support communication with one or more nodes by establishing a HTTP connection with the URL resource. See block 70. In an instance in which the URL resource has information to provide that is relevant to the subscribe request, such as being of the type solicited by the subscribe request, for example, a temperature measurement, the apparatus, such as the processor, the communications interface or the like, may support communication with one or more nodes by receiving a response from the URL resource via the HTTP connection. See block 72 of FIG. 15. The apparatus, such as the processor, the communications interface or the like, may then proxy communication by creating a publish message in response to the response from the URL resource. See block 74. The apparatus of this embodiment, such as the processor, the communications interface or the like, may then support communication with the content-centric network by causing transmission of the publish message to each of the clients within the content-centric network that had subscribed to receive information of the requested type. See block 76.

In another example involving the apparatus 20 proxying communication between nodes 18 within an HTTP network 16 and clients 14 within a content-centric network 12, reference is now made to FIG. 16 in which the initial request for information is made by a node within the HTTP network and the relevant information may thereafter be provided by a client within the content-centric network. In this embodiment, the apparatus, such as the processor 22, the communications interface 26 or the like, may be configured to support communication with the one or more nodes within the HTTP network by receiving a GET message via a HTTP connection with a respective node. See block 78 of FIG. 16. The apparatus, such as the processor, the communications interface or the like, may then proxy communication by creating a subscribe message in response to the GET message. See block 80. The apparatus, such as the processor, the communication interface or the like, may then support communication with the content-centric network by causing transmission of the subscribe message to one or more clients within the content-centric network, such as to one or more clients that are members of a multicast group. See block 82.

As before, once a client 14 within the content-centric network 12 that received the subscribe message has relevant information with respect to the information requested by the GET message issued by a node 18 within the HTTP network 16, the apparatus 20, such as the processor 22, the communications interface 26 or the like, may support communication with the content-centric network by receiving a publish message from a client in response to the subscribe message with the publish message providing the relevant information. See block 84 of FIG. 16. The apparatus, such as the processor, the communications interface or the like, may then proxy communication by creating a response corresponding to the publish message. See block 86 of FIG. 16. The apparatus, such as the processor, the communications interface or the like, may then support communication with one or more nodes of the HTTP network by causing transmission of the response via HTTP to the one or more nodes that initially requested the information via a GET message. See block 88. As such, nodes within the HTTP network of this example embodiment may obtain relevant information from one or more clients within a content-centric network as a result of the proxy of the communications provided by the apparatus.

As described above, a method, apparatus and computer program product are provided to proxy communication between different types of networks, such as different types of networks that communicate in accordance with different protocols, different messaging patterns or the like. For example, a method, apparatus and computer program product of one embodiment may proxy communication between a content-centric network, such as the Nokia Instant Community powered by AwareNet, and a network within the Internet domain, such as a CoAP network or a HTTP network. Thus, a method, apparatus and computer program product of an example embodiment facilitate communications between devices within the different networks, such as between a device within a content-centric network and a device within the Internet domain, for example, a device within a CoAP network or a HTTP network.

As described above, FIGS. 3, 4 and 14-16 illustrate flowcharts of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   supporting communication with a content-centric network having one or more clients that are configured to communicate with publish and subscribe messages;
   supporting communication with one or more nodes configured to communicate in an internet domain;
   proxying communication between one or more clients in the content-centric network using the publish and subscribe messages and one or more nodes in the internet domain using an internet domain message;
   creating a reply message with an observe option in response to the publish and subscribe messages; and
   causing transmission of the reply message with the observe option to the one or more nodes in the internet domain.

2. A method according to claim 1 wherein supporting communication with one or more nodes comprises supporting communication with a constrained application protocol network.

3. A method according to claim 1 wherein supporting communication with one or more nodes comprises supporting communication with a multicast group of one or more nodes.

4. A method according to claim 3 wherein the multicast group is associated with a respective resource to which a client in the content-centric network subscribes.

5. A method according to claim 3 wherein the multicast group is associated with proxied communication between the content-centric network and the one or more nodes in the internet domain.

6. A method according to claim 3 further comprising receiving a request from one or more nodes to join the multicast group.

7. A method according to claim 1 wherein supporting communication with the one or more nodes comprises receiving an internet domain message from a node, wherein proxying communication comprises creating a subscribe message in response to the internet domain message, and wherein supporting communication with the content-centric network comprises causing transmission of the subscribe message.

8. A method according to claim 7 wherein supporting communication with the content-centric network further comprises receiving a publish message in response to the subscribe message.

9. A method according to claim 1 wherein supporting communication with the content-centric network comprises receiving a subscribe request comprising a uniform resource locator, wherein proxying communication comprises creating the internet domain message for the uniform resource locator resource in response to the subscribe request, and wherein supporting communication with one or more nodes comprises establishing a hypertext transport protocol connection with the uniform resource locator resource.

10. A method according to claim 9 wherein supporting communication with one or more nodes further comprises receiving a response from the uniform resource locator resource via the hypertext transport protocol connection, wherein proxying communication further comprises creating a publish message in response to the response, and wherein supporting communication with the content-centric network further comprises causing transmission of the publish message.

11. An apparatus comprising at least one processor and at least one memory including computer program code, the at least one memory and the computer program code configured to, with the processor, cause the apparatus to at least:
   support communication with a content-centric network having one or more clients that are configured to communicate with publish and subscribe messages;
   support communication with one or more nodes configured to communicate in an internet domain;
   proxy communication between one or more clients in the content-centric network using the publish and subscribe messages and one or more nodes in the internet domain using an internet domain message;
   create a reply message with an observe option in response to the publish and subscribe messages; and
   cause transmission of the reply message with the observe option to the one or more nodes in the internet domain.

12. An apparatus according to claim 11 wherein the at least one memory and the computer program code are configured to, with the processor, cause the apparatus to support communication with one or more nodes by supporting communication with a constrained application protocol network.

13. An apparatus according to claim 11 wherein the at least one memory and the computer program code are configured to, with the processor, cause the apparatus to support communication with one or more nodes by supporting communication with a multicast group of one or more nodes.

14. An apparatus according to claim 13 wherein the multicast group is associated with a respective resource to which a client in the content-centric network subscribes.

15. An apparatus according to claim 13 wherein the multicast group is associated with proxied communication between the content-centric network and the one or more nodes in the internet domain.

16. An apparatus according to claim 13 wherein the at least one memory and the computer program code are further configured to, with the processor, cause the apparatus to receive a request from one or more nodes to join the multicast group.

17. An apparatus according to claim 11 wherein the at least one memory and the computer program code are configured to, with the processor, cause the apparatus to support communication with the one or more nodes by receiving an internet domain message internet domain from a node, wherein the at least one memory and the computer program code are configured to, with the processor, cause the apparatus to proxy communication by creating a subscribe message in response to the internet domain message internet domain, and wherein the at least one memory and the computer program code are configured to, with the processor, cause the apparatus to support communication with the content-centric network by causing transmission of the subscribe message.

18. An apparatus according to claim 17 wherein the at least one memory and the computer program code are further configured to, with the processor, cause the apparatus to support communication with the content-centric network by receiving a publish message in response to the subscribe message.

19. An apparatus according to claim 11 wherein the at least one memory and the computer program code are configured to, with the processor, cause the apparatus to support communication with the content-centric network by receiving a subscribe request comprising a uniform resource locator, wherein the at least one memory and the computer program code are configured to, with the processor, cause the apparatus to proxy communication by creating the internet domain message for the uniform resource locator resource in response to the subscribe request, and wherein the at least one memory and the computer program code are configured to, with the processor, cause the apparatus to support communication with one or more nodes by establishing a hypertext transport protocol connection with the uniform resource locator resource.

20. An apparatus according to claim 19 wherein the at least one memory and the computer program code are further configured to, with the processor, cause the apparatus to support communication with one or more nodes by receiving a response from the uniform resource locator resource via the hypertext transport protocol connection, wherein the at least one memory and the computer program code are further configured to, with the processor, cause the apparatus to proxy communication by creating a publish message in response to the response, and wherein the at least one memory and the computer program code are further configured to, with the processor, cause the apparatus to support communication with the content-centric network by causing transmission of the publish message.

* * * * *